W. C. BRAMWELL.
FEEDERS FOR CARDING MACHINES, &c.
No. 180,533. Patented Aug. 1, 1876.
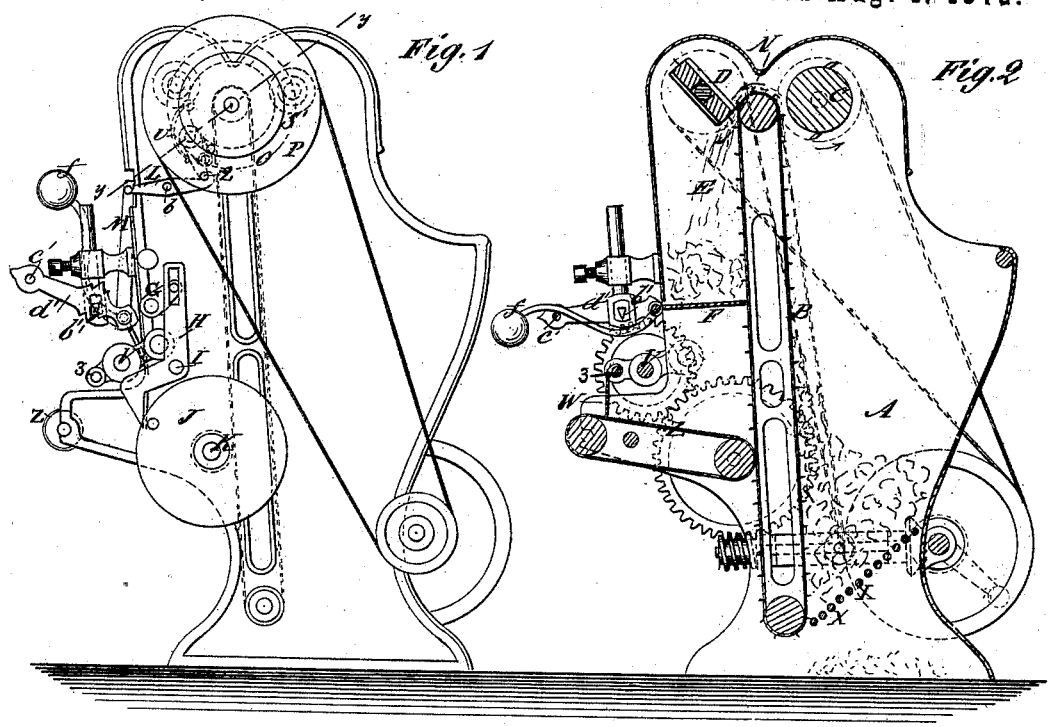
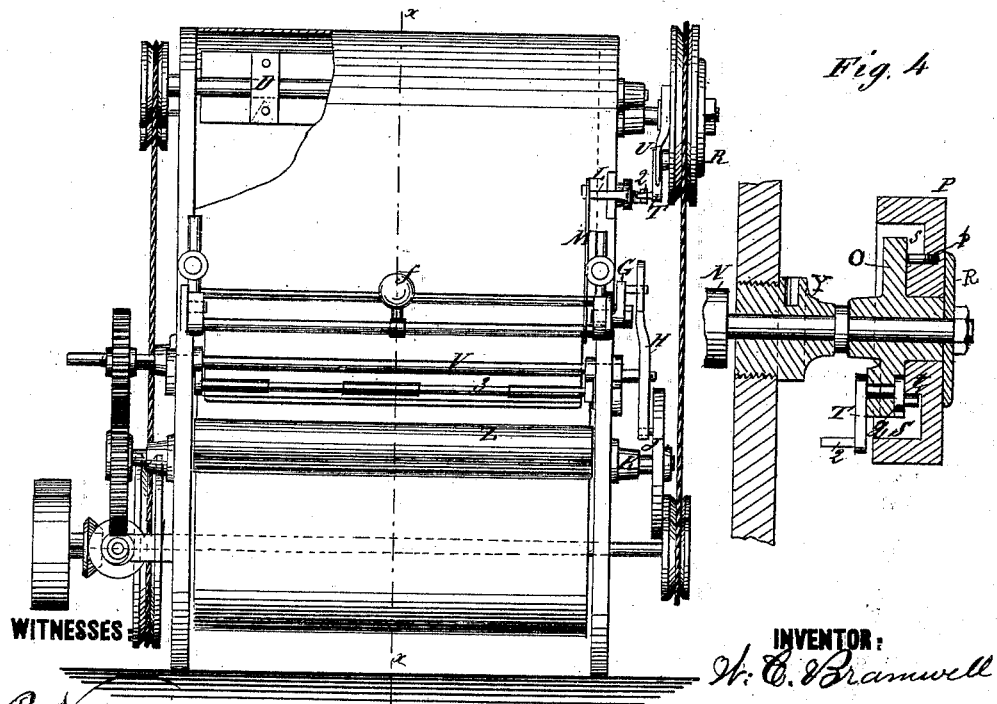
WITNESSES
C. Neveux
John Goethals
INVENTOR:
W. C. Bramwell
BY
ATTORNEYS.

UNITED STATES PATENT OFFICE.

WILLIAM C. BRAMWELL, OF TERRE HAUTE, IND., ASSIGNOR TO HIMSELF AND EDWIN ELLIS, OF SAME PLACE.

IMPROVEMENT IN FEEDERS FOR CARDING-MACHINES, &c.

Specification forming part of Letters Patent No. 180,533, dated August 1, 1876; application filed January 29, 1876.

*To all whom it may concern:*

Be it known that I, WILLIAM CALVERT BRAMWELL, of Terre Haute, in the county of Vigo and State of Indiana, have invented a new and Improved Feeder for Carding and other Machines, of which the following is a specification:

To those conversant with the subject it is well known that the old method of feeding by hand and weighing on of the wool is, if well attended to, one of the very best methods ever devised for the purpose. It happens, however, that hands intrusted with this important process are, as a rule, careless, or, by familiarity with the work, soon get into a careless habit, resulting in uneven work, caused by alternate heavy and light weighings, and other causes. Another objection is the expense, one hand being needed to each set of carding-engines.

Machines have been devised to obviate these objections, but, so far as I am aware, none have been successful to the degree required to secure its general adoption, or even its continued use, in one locality.

My invention consists of a tilting-scale for weighing the wool deposited upon it by a toothed traveling-apron, the two (scale and apron) being so connected by a clutch mechanism that the apron is stopped intermittingly, thus shutting off further supply until the scale has deposited or discharged the wool which it already contains. The wool having been thus deposited on the feed-table, and the scale returned to its original position, and while the elevating-apron is delivering a fresh supply to the scale, a loosely-pivoted rotating scraper or equalizer is at work removing the pile of wool just dropped by the scale, and pressing it up to the edge of that which has already been fed on and is about to enter the feed-rolls of carding-engine. By this operation the wool is removed out of the way, and a clear place given to the next lot, so that it may not, by piling up, obstruct the proper action of the tilting-pan of the scale, and that all the wool may be dropped each time.

The tilting and emptying out of the wool from the scale is entirely independent of the time it may take the scale to turn its balance, as this time is constantly varying. For instance, if a fresh supply of wool has just been thrown into the box or case, it not only raises the level and consequently increases the contact of the wool with the elevating-apron, thus tending to make the latter raise a greater amount than before the addition, but the wool so thrown in is far more compact than that which has been opened and picked apart in the machine, all of which tends very materially to increase the amount raised at each revolution, or part of same, of the elevating-apron, and thus the scale will quickly be filled to that point at which the balance is adjusted, and as quickly stop the delivery of the wool from the apron. It will then remain in this position until tilted, and consequently emptied of its contents.

As the wool becomes more bulky and lighter in weight, it takes the scale longer to receive a supply, but the speed of the elevating-apron and the tilting device of the scale are so proportioned that plenty of time is allowed the scale to fill and balance, even if there should only be, say, a handful or so of wool in the case.

It is by this means that the apparatus is caused to run itself out of wool when desired, and yet keep the work even to the last, which, probably, no other device, except hand-feeding, accomplishes.

Figure 1 is an end elevation of an apparatus arranged according to this invention. Fig. 2 is a longitudinal vertical section. Fig. 3 is a front elevation, with a part sectioned. Fig. 4 is a detail section.

Similar letters of reference indicate corresponding parts.

A is the case containing the wool, in the rear of which is the toothed belt or apron B, set in an almost vertical position. C is a picker cylinder or fan armed with teeth, and revolving in the same direction as the apron, but at a much greater velocity. D is a clearer fan or cylinder, which may either contain teeth or have simply straight-edged strips of leather or brushes to clear off from the elevating-apron B such wool as has passed the picker-cylinder. It revolves in the opposite direction to the apron, and at a somewhat greater speed than the picker C, the wool by its action being swept off the apron into the spout E, where it falls into the pan of scale F, to be weighed. The pan F, forming a division in the spout E, is enough smaller than the area of the spout to allow of its free action.

G shows a lever composed of two arms, secured to a journal passing through a suitable support. One of these arms is inside the frame and immediately over the pan of the scale, the other arm being outside and carrying a pin working in the upper end of slotted lever H, which works on a stud at I, and is actuated by the pins in wheel J, the latter being attached to the shaft of feed-roll K.

The pins in J, acting on the lever H, cause the lever G to make a quarter revolution, thus depressing the scale-pan F until it assumes nearly or quite a vertical position, thus dropping the wool onto the feed-table Z. After any of the pins in J have ceased to act on the scale-pan F, the latter is immediately returned to a horizontal plane by the bent lever and counter-balance weight $f\,f$, and the scale reset, as before.

L is a lever working on a stud, $b$, one end being in connection with the scale through the pitman M, and the opposite end provided with a lug or projection for the purpose of operating a coupling device to the elevating-apron, Fig. 1, through the action of the weighing-scale, the said device being as follows:

N is the supporting-roller of the elevating-apron B. The disk O is secured to the shaft or journal of said roll, which carries upon it also the loose pulley P, held in position by the collar R. P has an annular groove formed on its inner face at S S, which is continuous except at one point, where a portion of its width is stopped by a pin, $p$.

O carries a double crank-lever, T, one arm of which, $q$, is inclosed by a recess in the inner face of O, so as to be flush with said face. This arm has a wrist-pin, $t$, which enters the annular groove in P, and is held in this position by the spring U. This also causes the pin $p$, in the annular groove in P, to coincide, thus transmitting the motion of P to the apron B.

The other arm of double crank T also carries a pin, 2, which catches on the projection of lever L, Figs. 1 and 3, whenever said lever is actuated by the scale, and its end carrying the projection raised. This action changes the position of the pins in the annular groove of pulley P, so that they are no longer in contact, and consequently the apron B stops its delivery of stock to the scale. When the scale has been emptied of its contents, it releases the lever T, and the parts return to their original position for delivering a fresh supply of material to the scale. V is a shaft, having secured to it, on each side of the machine, arms, through which a rod, 3, parallel with the shaft, is also secured. To the latter is hinged a swinging plate or board, W, in such manner that when the arms arrive in the course of their revolution, in a certain position, the plate W becomes overbalanced, and falls onto and to the rear of the stock previously dropped by the scale. The arms, continuing their movement, draw the stock along the feed-table until they begin to rise, thus lifting the swinging plate vertically from the edge of the stock, which is thus left clear. Owing to the swinging plate traveling at double the speed of the feed-table, the wool is pushed up compact and equal all along, thus equalizing any deficiencies in a simple manner. In Fig. 2, at X, is seen a series of rods of iron, either round or other shape, at proper distances apart, and placed longitudinally across the lower part of the case A. They are set in a curved angle to the apron B, in such manner that the wool, or similar stock, on being acted upon by the teeth in apron B, will be more or less agitated and drawn over the bars or rods, thus sifting out of said stock foreign substances of greater specific gravity than the wool, such as dirt, chaff, straw, &c., which readily drop through or between said rods.

In machinery of this class, wire screen has been used for this purpose; but experience has proved that the rods are superior, because they offer less resistance to the dirt, and more effectually cleanse the stock contained in the case.

Fig. 4 shows a section of the main frame of the machine herein described, with a removable head at Y, for withdrawing the feed-roll N, the opening through the frame being of sufficient size for the purpose when the head is removed. In this manner any of the rolls can be removed at any time for any purpose in a convenient manner. These heads may be made of sufficient size to screw into the frame, but are preferably in the form of circular plates attached to lugs cast on the frame for the purpose, or in any other approved manner. Through the heads the journals of the rollers, &c., pass, the heads acting as supports to the same. $d'$ represents the ends of scale; $b'$, pivot or knife-edge; $c'$, rods or braces attaching the scale ends together.

From the foregoing description it will be observed that the apron B, armed with teeth, performs merely the operation of raising the wool or other textile material out of the case to a height sufficient to be delivered to the scale, where it is weighed before being delivered to the feed-table, the action of the weighing-scale instantly stopping further supply of stock the moment sufficient has been received by the scale; and it is this which forms the important feature of my invention.

I reserve the right to make a future application for that form of the clearer D in which straight-edged strips of leather are employed.

Having thus described my invention, I claim as new and desire to secure by Letters Patent—

1. In combination with a scale for weighing wool, and mechanism for delivering the same to the scale, a grooved pulley, lever L, lever T having pins $t\,2$, and bar M, substantially as shown and described, whereby the motion of said mechanism is arrested when the scale is tilted.

2. The combination of the weighted arm $f$, the tilting scale, the heads or arms $d'$, and cross-rod $c'$, with the arm M, lever L, spring-lever T, having pins $t\,2$, the grooved pulley P, and feed-apron, as shown and described, whereby the fall of the weighted arm releases the clutch, and sets the apron again in motion.

3. The combination, with the apron Z, of the revolving scraper W, pivoted loosely to arms of the rotating shaft V, and mechanism for operating the same, as shown and described.

4. A feeding apparatus for carding-engines of any kind, having an automatically-operating weighing-scale arranged so as to deposit its stock at regular intervals, and shut off the supply when balanced, and readjust itself when emptied of its contents, with a case for containing the stock to be fed, having a bottom composed of rods of iron of suitable shape, set at an angle with an intermittingly-revolving toothed apron, an equalizer, and the feed mechanism of a carding machine, all arranged substantially as herein specified and described.

WILLIAM C. BRAMWELL.

Witnesses:
JAMES ELLIS,
W. A. CRAWFORD.